US008283077B1

(12) United States Patent
Visco et al.

(10) Patent No.: US 8,283,077 B1
(45) Date of Patent: Oct. 9, 2012

(54) STRUCTURES AND FABRICATION TECHNIQUES FOR SOLID STATE ELECTROCHEMICAL DEVICES

(75) Inventors: Steven J. Visco, Berkeley, CA (US); Craig P. Jacobson, Moraga, CA (US); Lutgard C. DeJonghe, Lafayette, CA (US)

(73) Assignee: The Regents of The University of California, Oakland, CA (US)

( * ) Notice: Subject to any disclaimer, the term of this patent is extended or adjusted under 35 U.S.C. 154(b) by 1278 days.

(21) Appl. No.: 12/027,183

(22) Filed: Feb. 6, 2008

Related U.S. Application Data

(60) Continuation of application No. 11/471,774, filed on Jun. 20, 2006, now Pat. No. 7,351,488, which is a continuation of application No. 11/260,009, filed on Oct. 26, 2005, now Pat. No. 7,118,777, which is a continuation of application No. 10/273,812, filed on Oct. 17, 2002, now Pat. No. 6,979,511, which is a division of application No. 09/626,629, filed on Jul. 27, 2000, now Pat. No. 6,605,316.

(60) Provisional application No. 60/146,769, filed on Jul. 31, 1999.

(51) Int. Cl.
*H01M 8/06* (2006.01)
*H01M 8/04* (2006.01)
(52) U.S. Cl. ........................................ 429/408; 429/423
(58) Field of Classification Search .................. 429/408, 429/423
See application file for complete search history.

(56) References Cited

U.S. PATENT DOCUMENTS

| | | | |
|---|---|---|---|
| 3,324,543 A | 6/1967 | McVey et al. | |
| 3,402,230 A | 9/1968 | White | |
| 3,525,646 A | 8/1970 | Tannenberger et al. | |
| 3,668,010 A | 6/1972 | Falley et al. | |
| 3,773,549 A | 11/1973 | Elbert et al. | |
| 4,560,607 A | 12/1985 | Sumner | |
| 4,562,124 A | 12/1985 | Ruka | |
| 4,578,214 A * | 3/1986 | Jungerhans | 252/376 |
| 4,624,897 A | 11/1986 | Ito | |
| 4,687,717 A | 8/1987 | Kaun et al. | |
| 4,720,335 A | 1/1988 | Fukushima et al. | |
| 4,763,828 A | 8/1988 | Fukaya et al. | |
| 4,847,172 A | 7/1989 | Maskalick et al. | |
| 4,917,958 A | 4/1990 | Akai et al. | |
| 4,929,294 A | 5/1990 | Blome | |
| 4,942,999 A | 7/1990 | Oda et al. | |
| 5,013,612 A | 5/1991 | Hunt et al. | |
| 5,043,229 A | 8/1991 | Mizuhara | |
| 5,127,969 A | 7/1992 | Sekhar | |
| 5,173,372 A | 12/1992 | Matsuo et al. | |
| 5,236,787 A | 8/1993 | Grassi | |
| 5,240,480 A | 8/1993 | Thorogood et al. | |
| 5,279,909 A | 1/1994 | Horner et al. | |
| 5,306,411 A | 4/1994 | Mazanec et al. | |
| 5,318,951 A | 6/1994 | Shintaku et al. | |
| 5,328,779 A | 7/1994 | Tannenberger et al. | |
| 5,366,770 A | 11/1994 | Wang | |
| 5,409,784 A * | 4/1995 | Bromberg et al. | 429/411 |
| 5,441,825 A | 8/1995 | Barlow | |
| 5,480,739 A | 1/1996 | Kawasaki et al. | |
| 5,487,803 A | 1/1996 | Sweeney et al. | |
| 5,589,285 A | 12/1996 | Cable et al. | |
| 5,626,914 A | 5/1997 | Ritland et al. | |
| 5,629,103 A | 5/1997 | Wersing et al. | |
| 5,633,081 A | 5/1997 | Clough et al. | |
| 5,670,270 A | 9/1997 | Wallin | |
| 5,672,848 A | 9/1997 | Komorita et al. | |
| 5,686,198 A | 11/1997 | Kuo et al. | |
| 5,735,332 A | 4/1998 | Ritland et al. | |
| 5,750,279 A | 5/1998 | Carolan et al. | |
| 5,827,620 A | 10/1998 | Kendall | |
| 5,908,713 A | 6/1999 | Ruka et al. | |
| 5,932,368 A | 8/1999 | Batawi et al. | |
| 5,938,822 A | 8/1999 | Chen et al. | |
| 5,976,216 A | 11/1999 | Samal et al. | |
| 5,993,986 A | 11/1999 | Wallin et al. | |
| 6,007,683 A | 12/1999 | Jankowski et al. | |
| 6,017,647 A | 1/2000 | Wallin | |
| 6,188,582 B1 | 2/2001 | Peter | |
| 6,217,732 B1 | 4/2001 | Schuh et al. | |
| 6,270,642 B1 | 8/2001 | Basu et al. | |
| 6,293,978 B2 | 9/2001 | Kleefisch et al. | |
| 6,296,910 B1 | 10/2001 | Choy et al. | |

(Continued)

FOREIGN PATENT DOCUMENTS

CN 101065860 10/2007

(Continued)

OTHER PUBLICATIONS

Christiansen, "Solid Oxide Fuel Cell", Aug. 9, 2001, U.S. Patent Application Publication, Publication No. US 2001/0012576 A1.
Seabaugh, et al., Low-Cost Fabrication Processes for Solid Oxide Fuel Cells, NexTech exhibited at the Fuel Cells 2000 Conference in Portland Oct. 30-Nov. 2, 2000, NexTech Materials, Ltd.
Steele, et al., "Fuel Cells" Pub. No. US 2002/0048699A1, Pub. Date: Apr. 25, 2002, pp. 1-9.
Fujii, K., et al., "Manufacturing and Charaterization of Metallic System Support Tube for Solid Oxide Fuel Cells", Bullentin of the Electrotechnical Laboratory, vol. 62, No. 1-2, 1998, pp. 1319.
Momma, et al., "High Potential Performance of Tubular Type SOFC Using Metallic System Components", Electrotechnical Laboratory, Electrochemical Proceedings vol. 97-40, Jun. 1997, pp. 310-321.

(Continued)

*Primary Examiner* — Patrick Ryan
*Assistant Examiner* — Muhammad Siddiquee
(74) *Attorney, Agent, or Firm* — Weaver Austin Villeneuve & Sampson LLP

(57) ABSTRACT

Porous substrates and associated structures for solid-state electrochemical devices, such as solid-oxide fuel cells (SOFCs), are low-cost, mechanically strong and highly electronically conductive. Some preferred structures have a thin layer of an electrocatalytically active material (e.g., Ni—YSZ) coating a porous high-strength alloy support (e.g., SS-430) to form a porous SOFC fuel electrode. Electrode/electrolyte structures can be formed by co-firing or constrained sintering processes.

10 Claims, 11 Drawing Sheets

U.S. PATENT DOCUMENTS

| | | |
|---|---|---|
| 6,344,291 B1 | 2/2002 | Hitomi |
| 6,348,273 B1 | 2/2002 | Ishikawa et al. |
| 6,358,567 B2 | 3/2002 | Pham et al. |
| 6,368,383 B1 | 4/2002 | Virkar et al. |
| 6,372,078 B1 | 4/2002 | Melchert et al. |
| 6,390,354 B1 | 5/2002 | Makino et al. |
| 6,420,064 B1 | 7/2002 | Ghosh et al. |
| 6,428,920 B1 | 8/2002 | Badding et al. |
| 6,436,565 B1 | 8/2002 | Song et al. |
| 6,440,578 B1 | 8/2002 | Shinkai et al. |
| 6,492,050 B1 | 12/2002 | Sammes |
| 6,541,146 B1 | 4/2003 | Xue et al. |
| 6,565,621 B2 | 5/2003 | Shinkai et al. |
| 6,576,363 B1 | 6/2003 | Hitomi |
| 6,589,680 B1 | 7/2003 | Gorte et al. |
| 6,605,316 B1 | 8/2003 | Visco et al. |
| 6,653,009 B2 | 11/2003 | Wang et al. |
| 6,656,625 B1 | 12/2003 | Thompson et al. |
| 6,682,842 B1 | 1/2004 | Visco et al. |
| 6,742,700 B2 | 6/2004 | Makino et al. |
| 6,767,622 B2 | 7/2004 | Hada et al. |
| 6,767,662 B2 | 7/2004 | Jacobson et al. |
| 6,783,880 B2 | 8/2004 | Christiansen |
| 6,800,323 B2 | 10/2004 | Pan |
| 6,846,511 B2 | 1/2005 | Visco et al. |
| 6,887,361 B1 | 5/2005 | Visco et al. |
| 6,896,992 B2 | 5/2005 | Kearl |
| 6,974,516 B2 | 12/2005 | Devoe et al. |
| 6,979,511 B2 | 12/2005 | Visco et al. |
| 6,994,884 B1 | 2/2006 | Guan et al. |
| 7,055,733 B2 | 6/2006 | Weil et al. |
| 7,118,777 B2 | 10/2006 | Visco et al. |
| 7,153,559 B2 | 12/2006 | Ito et al. |
| 7,163,713 B2 | 1/2007 | Jacobson et al. |
| 7,208,246 B2 | 4/2007 | Herman et al. |
| 7,218,502 B2 | 5/2007 | Fujii et al. |
| 7,232,626 B2 | 6/2007 | Jacobson et al. |
| 7,273,673 B2 | 9/2007 | Akikusa et al. |
| 7,351,488 B2 | 4/2008 | Visco et al. |
| 7,553,573 B2 | 6/2009 | Visco et al. |
| 2002/0028367 A1 | 3/2002 | Sammes et al. |
| 2002/0081762 A1 | 6/2002 | Jacobson et al. |
| 2002/0177031 A1 | 11/2002 | Doshi et al. |
| 2003/0021900 A1 | 1/2003 | Jacobson et al. |
| 2003/0024611 A1 | 2/2003 | Cornie et al. |
| 2003/0059668 A1 | 3/2003 | Visco et al. |
| 2003/0132270 A1 | 7/2003 | Weil et al. |
| 2003/0188637 A1 | 10/2003 | Ito et al. |
| 2003/0224234 A1 | 12/2003 | Steele et al. |
| 2004/0023101 A1 | 2/2004 | Jacobson et al. |
| 2004/0028994 A1 | 2/2004 | Akikusa et al. |
| 2004/0112478 A1 | 6/2004 | Bieler et al. |
| 2004/0135324 A1 | 7/2004 | Brule et al. |
| 2004/0219423 A1 | 11/2004 | Tunney et al. |
| 2004/0231143 A1 | 11/2004 | Visco et al. |
| 2004/0240142 A1 | 12/2004 | Fujii et al. |
| 2005/0000621 A1 | 1/2005 | Devoe et al. |
| 2005/0022921 A1 | 2/2005 | Morrison et al. |
| 2005/0037252 A1 | 2/2005 | Pham |
| 2005/0048343 A1 | 3/2005 | Thirukkvalur |
| 2005/0095479 A1 | 5/2005 | Mardilovich et al. |
| 2005/0147857 A1 | 7/2005 | Crumm et al. |
| 2005/0170234 A1 | 8/2005 | Liu et al. |
| 2005/0214612 A1 | 9/2005 | Visco et al. |
| 2005/0214616 A1 | 9/2005 | Kumar et al. |
| 2005/0221153 A1 | 10/2005 | Sugimoto et al. |
| 2005/0271931 A1 | 12/2005 | Finnerty |
| 2006/0029860 A1 | 2/2006 | Ketcham et al. |
| 2006/0051643 A1 | 3/2006 | Sarkar et al. |
| 2006/0057295 A1 | 3/2006 | Visco et al. |
| 2006/0153974 A1 | 7/2006 | Matsuzaki et al. |
| 2006/0228615 A1 | 10/2006 | Armstrong et al. |
| 2006/0234112 A1 | 10/2006 | Visco et al. |
| 2007/0059576 A1 | 3/2007 | Jacobson et al. |
| 2007/0117006 A1 | 5/2007 | Zhan et al. |
| 2007/0166603 A1 | 7/2007 | Nakanishi et al. |
| 2008/0118804 A1 | 5/2008 | Tucker et al. |
| 2008/0131723 A1 | 6/2008 | Tucker et al. |
| 2008/0254335 A1 | 10/2008 | Torgerson et al. |
| 2008/0268323 A1 | 10/2008 | Tucker et al. |
| 2010/0038012 A1 | 2/2010 | Tucker et al. |
| 2010/0143824 A1 | 6/2010 | Tucker et al. |
| 2011/0053041 A1 | 3/2011 | Tucker et al. |
| 2011/0104586 A1 | 5/2011 | Tucker et al. |
| 2011/0269047 A1 | 11/2011 | Tucker et al. |

FOREIGN PATENT DOCUMENTS

| | | |
|---|---|---|
| CN | ZL200580040834 | 8/2009 |
| CN | ZL200580041105 | 12/2009 |
| EP | 428275 | 5/1991 |
| EP | 562724 | 9/1993 |
| EP | 1122806 | 8/2001 |
| EP | 1699104 | 9/2006 |
| FR | 1585403 | 1/1970 |
| GB | 1276615 | 6/1972 |
| GB | 1 383 343 | 12/1974 |
| GB | 2156257 | 11/1984 |
| JP | 59-046695 | 9/1980 |
| JP | 56-002549 | 1/1981 |
| JP | 59-015960 | 1/1984 |
| JP | 59-016695 | 1/1984 |
| JP | 60-090875 | 5/1985 |
| JP | 05-089883 | 4/1993 |
| JP | 05-163078 | 6/1993 |
| JP | 06-042990 | 2/1994 |
| JP | 40-700676801 | 1/1995 |
| JP | 07-069749 | 4/1995 |
| JP | 07-126079 | 5/1995 |
| JP | 07-237980 | 9/1995 |
| JP | 07-267747 | 10/1995 |
| JP | 09-092301 | 4/1997 |
| JP | 09-188582 | 7/1997 |
| JP | 09-296203 | 11/1997 |
| JP | 10-021931 | 1/1998 |
| JP | 11-292618 | 10/1999 |
| JP | 11-297333 | 10/1999 |
| JP | 2001-126745 | 5/2001 |
| JP | 2002-289249 | 10/2002 |
| JP | 2002-301588 | 10/2002 |
| JP | 2003-288913 | 10/2003 |
| JP | 2004-039574 | 2/2004 |
| JP | 2004-047598 | 2/2004 |
| JP | 2004-127761 | 4/2004 |
| JP | 2004-142971 | 5/2004 |
| JP | 2004-164864 | 6/2004 |
| JP | 2004-207088 | 7/2004 |
| JP | 2004-273736 | 9/2004 |
| JP | 2005-288526 | 10/2005 |
| JP | 2005-353493 | 12/2005 |
| RU | 1822388 | 6/1993 |
| RU | 2197441 | 1/2003 |
| RU | 2236331 | 9/2004 |
| SU | 1407675 | 7/1988 |
| WO | WO97/00734 | 9/1997 |
| WO | 99/52165 | 10/1999 |
| WO | 9952165 | 10/1999 |
| WO | 99/65642 | 12/1999 |
| WO | 99/66570 | 12/1999 |
| WO | 00/34539 | 6/2000 |
| WO | 00/52780 | 9/2000 |
| WO | 03/007312 | 1/2003 |
| WO | 2004/008556 | 1/2004 |
| WO | 2004/070858 | 8/2004 |
| WO | 2006/044313 | 4/2006 |
| WO | 2006/082057 | 8/2006 |
| WO | 2006/086037 | 8/2006 |
| WO | 2006/091250 | 8/2006 |
| WO | 2006086037 | 8/2006 |
| WO | 2006/116153 | 11/2006 |
| WO | 2006/127045 | 11/2006 |
| WO | 2008/016345 | 2/2008 |
| WO | 2009/014775 | 1/2009 |
| WO | 2009/099447 | 8/2009 |
| WO | 2009/128849 | 10/2009 |
| WO | 2010/030300 | 3/2010 |

OTHER PUBLICATIONS

Okuo, et al., "Development of Metallic Substrate Tubular SOFC", Electrotechnical Laboratory, Oct. 1994, pp. 908-919.
Okua, T., et al., "Improvement in Power Stability and Durability Demonstration on New Tubular Type SOFC Using Metallic System Component", vol. 60, No. 5, 1996 pp. 1-9.
Schiller, G., et al., "Development of Metallic Substrate Supported Thin-Film SOFC by Applying Plasma Spray Techniques", Electrochemical Society Proceedings vol. 99-19, Oct. 1999, pp. 892-903.
Schiller, G., et al., "Development of Plasma Sprayed Components for a New SOFC Designs", Electrochemical Proceedings vol. 97-40, Oct. 1999, pp. 634-645.
Schiller, G. et al., "Development of SOFC Components by Vacuum Plasma Spraying", 1998, pp. 515-518.
Takenoiri, et al., "Development of Metallic Substrate Supported Planar SOFC at Fuji Electric", Fuel Cell Seminar Abstracts, Nov. 1998, pp. 84-87.
Unal, et al., "Microstructures of $Y_2O_3$-Stabilized $ZrO_2$ Electron Beam-Physical Vapor Deposition Coatings on Ni-Base Superalloys", Department of Materials Science and Engineering, vol. 984-92, 1994, pp. 984-992.
Wallin, et al., "Cofired Solid Oxide Fuel Cells for Operation at 800°C", 1997, Abstract.
Yao, et al, "Improved preparation procedure and properties for a multiplayer piezoelectric thick-film actuator", Sensors and Actuators A 71, Received Dec. 9, 1997; received in revised form Apr. 27, 1998; accepted May 1, 1998, pp. 139-143.
"Mfg. Oxygen Sensor—Involves Applying Catalyst Metal Salt Soln. to Sintered Electrolyte, Reducing, Firing, Again Applying Metal Salt Soln. and Firing", Matsushita Elec Ind Co Ltd [MATU], 1979JP-0078760 (Jun. 21, 1979), (abstract), pp. 1-2.
U.S. Appl. No. 11/471,774, Notice of Allowance mailed Oct. 30, 2007.
U.S. Appl. No. 11/471,774, Allowed Claims.
CN patent application No. 200580040834.4, Office Action mailed Aug. 1, 2008.
CN patent application No. 200580041105.0, Office Action mailed Oct. 24, 2008.
CN patent application No. 200580040834.4, Notification to grant patent right for invention, mailed Apr. 17, 2009.
CA patent application No. 2,627,786, Office Action mailed Dec. 21, 2010.
CN patent application No. 200580041105.0, Notification to grant patent right for invention, mailed Aug. 28, 2009.
AU patent application No. 2005332026, Exam Report mailed Sep. 29, 2010.
AU patent application No. 2005327925, Office Action mailed Jul. 5, 2010.
AU patent application No. 2005327164, Office Action mailed Aug. 6, 2010.
EP patent application No. 05857980.6, Supplemental Search Report mailed Dec. 15, 2009.
EP patent application No. 05857595.2, Search Report mailed Oct. 15, 2009.
EP patent application No. 05857587.9, Supplemental Search Report mailed Oct. 26, 2009.
JP patent application No. 2007-543481, Exam Report mailed Oct. 5, 2010.
JP patent application No. 2007-543481, Notification of reasons for rejection mailed Oct. 5, 2010 (English translation).
Translated excerpt from JP2005-288526.
Translated excerpt from JP2004-047598.
MY patent application No. PI 20055578, Examination Report mailed Aug. 14, 2009.
RU patent application No. 2007124484-02, Office Action mailed Nov. 16, 2009.
TW patent application No. 094141561, Examination Report mailed Mar. 8, 2010.
RU patent application No. 200712448309, Office Action mailed Jan. 26, 2009.
CN patent application No. 200680055443.4, Office Action mailed Dec. 21, 2010.
RU patent application No. 200910693002, Office Action mailed Sep. 21, 2010.
VN patent application No. 1-2007-01278, Exam Report mailed Jul. 7, 2007.
VN patent application No. 1-2007-01267, Exam Report mailed Jul. 29, 2009.
WO patent application No. PCT/US05/42995 International Search Report and Written Opinion mailed Dec. 26, 2006.
WO patent application No. PCT/US05/43109 International Search Report and Written Opinion mailed Oct. 12, 2006.
WO patent application No. PCT/US05/42572, International Search Report and Written Opinion mailed Jun. 29, 2006.
WO patent application No. PCT/US05/042572, International Preliminary Report on Patentability mailed Jun. 14, 2006.
WO patent application No. PCT/US2006/029580, International Search Report and Written Opinion mailed Jul. 3, 2008.
WO patent application No. PCT/US2008/060362, International Search Report and Written Opinion mailed Jan. 12, 2009.
WO patent application No. PCT/US2008/066737, International Search Report and Written Opinion mailed Jan. 29, 2009.
WO patent application No. PCT/US2008/053869, International Search Report and Written Opinion mailed Oct. 29, 2008.
WO patent application No. PCT/US2008/081531, International Search Report and Written Opinion mailed Mar. 31, 2009.
Naka, Masaaki et al., "Joining of plain carbon steel to alumina with copper filler metal", XP009010006, Nov. 1985.
Stevenson, Jeff, "SOFC Seals: Materials Status", SSECA core technology program—SOFC meeting, Jul. 8, 2003.
Lee, Sungkyu et al., "Fabrication and characterization of Cu/YSZ cermet high-temperature electrolysis cathode material prepared by high-energy ball-milling method I.900°C-sintered", Journal of Alloys and Compounds, 448 (2008) 363-367.
Gorte, Raymond J. et al., "Anodes for direct oxidation of dry hydrocarbons in a solid-oxide fuel cell", Advanced materials, 2000, 12, No. 19, Oct. 2, 2000.
Park, Seungdoo et al., "Direct oxidation of hydrocarbons in a solid oxide fuel cell I. methane oxidation", Journal of the Electrochemical Society, 146 (10) 3603-3605 (1999).
Li, J.Q. et al., "Fabrication and thermal properties of a YSZ-NiCr joint with an interlayer of YSZ-NiCr functionally graded material", Journal of the European Ceramic Society 23 (2003) 1847-1853.
Zhou, Xia et al., "Fabrication of composite alloy cladding material by brazing process", Journal of Materials Processing Technology 168 (2005) 280-285.
Zhu, Minguang et al., "Improving the strength of brazed joints to alumina by adding carbon fibres", Chapman & Hall, 0022-2461, 1997, pp. 5321-5333, Apr. 17, 1997.
Blugan, Gurdial et al., "Brazing of silicon nitride ceramic composite to steel using SiC-particle-reinforced active brazing alloy", Ceramics International, 0272-8842, 2006, Elsevier Ltd.
U.S. Appl. No. 11/791,269, Office Action mailed Dec. 27, 2010.
U.S. Appl. No. 11/791,258, Office Action mailed Feb. 16, 2011.
European Examination Report mailed Feb. 14, 2011, for Application No. 08 768 912.1-3122.
JP patent application No. 2007-543579, Office Action mailed Jan. 25, 2011.
European Examination Report mailed Jun. 17, 2011 for Application No. 08770865.7.
U.S. Appl. No. 11/791,258, Office Action mailed Aug. 18, 2011.
U.S. Appl. No. 11/791,269, Office Action mailed Sep. 30, 2011.
U.S. Appl. No. 12/304,191, Office Action mailed Sep. 30, 2011.
EP patent application No. 05857587.9, Examination Report mailed Aug. 15, 2011.
MY patent application No. PI 20055579, Substantive Examination Adverse Report mailed Aug. 15, 2011.
CN patent application No. 200680055443.4, Second Office Action mailed Jul. 12, 2011.
PH patent application No. 12008502790, Office Action mailed Sep. 12, 2011.
EP patent application No. 08826523.6, Extended Search Report mailed Aug. 30, 2011.
U.S. Appl. No. 11/791,270, Office Action mailed Jul. 27, 2011.
U.S. Appl. No. 11/791,258, Office Action mailed Dec. 6, 2011.

JP patent application No. 2007-543579, Final Decision of Rejection mailed Oct. 4, 2011.
CA patent application No. 2,627,863, Office Action mailed Nov. 17, 2011.
JP patent application No. 2007-543481, Office Action mailed Nov. 29, 2011.
JP patent application No. 2009-521730, Office Action mailed Oct. 25, 2011.
RU patent application No. 2010147046/20(067957), Office Action of the Formal Examination mailed May 4, 2011.
MY patent application No. PI20055578, substantive examination mailed Dec. 30, 2011.
KR patent application No. 10-2007-7009946, Notification of Provisional Rejection mailed Jan. 20, 2012.
IN patent application No. 2386/KOLN/2007, First Examination Report mailed Jan. 31, 2012.
EP patent application No. 06836096.5, Supplementary European Search Report mailed Feb. 3, 2012.
Ishida et al., NGK Spark Plug Co. Ltd., abstract of JP 19830079832, Thomson Scientific, XP-002667365, Nov. 21, 1984.
Fujiki et al., Kobe Steel Ltd., abstract of JP 19960109959, Thomson Scientific, XP-002667366, Nov. 18, 1997.
AU patent application No. 2008279577, Examiner's first report mailed Jan. 27, 2012.
PH patent application No. 12010500175, Office Action mailed Feb. 2, 2012.
RU patent application No. 2010136676/20, Office Action of the Formal Examination mailed Jan. 17, 2011.
U.S. Appl. No. 11/791,270, Office Action mailed Mar. 15, 2012.
TW patent application No. 094141908, Search Report mailed Mar. 19, 2012.
U.S. Appl. No. 12/304,191, Notice of Allowance mailed May 14, 2012.
U.S. Appl. No. 12/082,320, Office Action mailed Apr. 13, 2011.
U.S. Appl. No. 12/082,320, Office Action mailed Nov. 9, 2011.
U.S. Appl. No. 12/082,320, Office Action mailed Mar. 28, 2012.
U.S. Appl. No. 10/061,127, Officse Action mailed Jun. 23, 2004.
U.S. Appl. No. 10/061,127, Notice of Allowance mailed Jan. 5, 2005.
U.S. Appl. No. 10/724,558, Notice of Allowance mailed Sep. 9, 2004.
U.S. Appl. No. 11/042,788, Office Action mailed Jan. 16, 2007.
U.S. Appl. No. 11/042,788, Office Action mailed Jan. 31, 2008.
U.S. Appl. No. 11/042,788, Office Action mailed Sep. 3, 2008.
U.S. Appl. No. 11/042,788, Office Action mailed Oct. 30, 2008.
U.S. Appl. No. 11,042,788, Notice of Allowance mailed Mar. 9, 2009.
U.S. Appl. No. 09/626,629, Office Action mailed May 9, 2002.
U.S. Appl. No. 09/626,629, Notice of Allowance mailed Aug. 13, 2002.
U.S. Appl. No. 10/273,812, Office Action mailed Nov. 30, 2004.
U.S. Appl. No. 10/273,812, Office Action mailed Mar. 21, 2005.
U.S. Appl. No. 10/273,812, Notice of Allownce mailed Aug. 3, 2005.
U.S. Appl. No. 11/260,009, Office Action mailed Feb. 17, 2006.
U.S. Appl. No. 11/260,009, Notice of Allowance mailed Apr. 28, 2006.
EP1228546, "Structures and fabrication techniques for solid state electrochemical devices," Visco et al., Aug. 7, 2002, abstract.

* cited by examiner

US 8,283,077 B1

STRUCTURES AND FABRICATION TECHNIQUES FOR SOLID STATE ELECTROCHEMICAL DEVICES

CROSS-REFERENCE TO RELATED APPLICATIONS

This application is a continuation of U.S. application Ser. No. 11/471,774, entitled STRUCTURES AND FABRICATION TECHNIQUES FOR SOLID STATE ELECTROCHEMICAL DEVICES filed Jun. 20, 2006; which is a continuation of U.S. application Ser. No. 11/260,009, entitled STRUCTURES AND FABRICATION TECHNIQUES FOR SOLID STATE ELECTROCHEMICAL DEVICES, now issued as U.S. Pat. No. 7,118,777; which is a continuation of U.S. application Ser. No. 10/273,812, entitled STRUCTURES AND FABRICATION TECHNIQUES FOR SOLID STATE ELECTROCHEMICAL DEVICES, now issued as U.S. Pat. No. 6,979,511; which is a divisional of U.S. application Ser. No. 09/626,629, entitled STRUCTURES AND FABRICATION TECHNIQUES FOR SOLID STATE ELECTROCHEMICAL DEVICES, now issued as U.S. Pat. No. 6,605,316; which claims priority of U.S. Provisional Application No. 60/146,769, entitled ALLOY SUPPORT STRUCTURE FOR CERAMIC ELECTROCHEMICAL DEVICES, filed Jul. 31, 1999; the disclosures of which are herein incorporated by reference.

STATEMENT OF GOVERNMENT SUPPORT

This invention was made with government support under Contract DE-ACO3-765F00098 awarded by the United States Department of Energy to The Regents of the University of California for the management and operation of the Lawrence Berkeley National Laboratory. The government has certain rights in this invention.

BACKGROUND OF THE INVENTION

The present invention relates generally to the field of solid state electrochemical devices, and more particularly to substrate, electrode and cell structures for solid state electrochemical devices.

Solid state electrochemical devices are often implemented as cells including two porous electrodes, the anode and the cathode, and a dense solid electrolyte and/or membrane which separates the electrodes. For the purposes of this application, unless otherwise explicit or clear from the context in which it is used, the term "electrolyte" should be understood to include solid oxide membranes used in electrochemical devices, whether or not potential is applied or developed across them during operation of the device. In many implementations, such as in fuel cells and oxygen and syn gas generators, the solid membrane is an electrolyte composed of a material capable of conducting ionic species, such as oxygen ions, or hydrogen ions, yet has a low electronic conductivity. In other implementations, such as gas separation devices, the solid membrane is composed of a mixed ionic electronic conducting material ("MIEC"). In each case, the electrolyte/membrane must be dense and pinhole free ("gas-tight") to prevent mixing of the electrochemical reactants. In all of these devices a lower total internal resistance of the cell improves performance.

The ceramic materials used in conventional solid state electrochemical device implementations can be expensive to manufacture, difficult to maintain (due to their brittleness) and have inherently high electrical resistance. The resistance may be reduced by operating the devices at high temperatures, typically in excess of 900° C. However, such high temperature operation has significant drawbacks with regard to the device maintenance and the materials available for incorporation into a device, particularly in the oxidizing environment of an oxygen electrode, for example.

The preparation of solid state electrochemical cells is well known. For example, a typical solid oxide fuel cell (SOFC) is composed of a dense electrolyte membrane of a ceramic oxygen ion conductor, a porous anode layer of a ceramic, a metal or, most commonly, a ceramic-metal composite ("cermet"), in contact with the electrolyte membrane on the fuel side of the cell, and a porous cathode layer of a mixed ionically/electronically-conductive (MIEC) metal oxide on the oxidant side of the cell. Electricity is generated through the electrochemical reaction between a fuel (typically hydrogen produced from reformed methane) and an oxidant (typically air). This net electrochemical reaction involves charge transfer steps that occur at the interface between the ionically-conductive electrolyte membrane, the electronically-conductive electrode and the vapor phase (fuel or oxygen). The contributions of charge transfer step, mass transfer (gas diffusion in porous electrode), and ohmic losses due to electronic and ionic current flow to the total internal resistance of a solid oxide fuel cell device can be significant. Moreover, in typical device designs, a plurality of cells are stacked together and connected by one or more interconnects. Resistive loss attributable to these interconnects can also be significant.

In work reported by de Souza and Visco (de Souza, S.; Visco, S. J.; De Jonghe, L. C. Reduced-temperature solid oxide fuel cell based on YSZ thin-film electrolyte. Journal of the Electrochemical Society, vol. 144, (no. 3), Electrochem. Soc, March 1997. p.L35-7. 7), a thin film of yttria stabilized zirconia (YSZ) is deposited onto a porous cermet electrode substrate and the green assembly is co-fired to yield a dense YSZ film on a porous cermet electrode. A thin cathode is then deposited onto the bilayer, fired, and the assembly is tested as an SOFC with good results. In work reported by Minh (Minh, N. Q. (Edited by: Dokiya, M.; Yamamoto, O.; Tagawa, H.; Singhal, S. C.) Development of thin-film solid oxide fuel cells for power generation applications. Proceedings of the Fourth International Symposium on Solid Oxide Fuel Cells (SOFC-IV), (Proceedings of the Fourth International Symposium on Solid Oxide Fuel Cells (SOFC-IV), Proceedings of Fourth International Symposium Solid Oxide Fuel Cells, Yokohama, Japan, 18-23 Jun. 1995.) Pennington, N.J., USA: Electrochem. Soc, 1995. p. 138-45), a similar thin-film SOFC is fabricated by tape calendaring techniques to yield a good performing device. However, these Ni—YSZ supported thin-film structures are mechanically weak, and will deteriorate if exposed to air on SOFC cool-down due to the oxidation of Ni to NiO in oxidizing environments. Also, nickel is a relatively expensive material, and to use a thick Ni—YSZ substrate as a mechanical support in a solid state electrochemical device will impose large cost penalties.

Solid state electrochemical devices are becoming increasingly important for a variety of applications including energy generation, oxygen separation, hydrogen separation, coal gasification, and selective oxidation of hydrocarbons. These devices are typically based on electrochemical cells with ceramic electrodes and electrolytes and have two basic designs: tubular and planar. Tubular designs have traditionally been more easily implemented than planar designs, and thus have been preferred for commercial applications. However, tubular designs provide less power density than planar designs due to their inherently relatively long current path that results in substantial resistive power loss. Planar designs are theoretically more efficient than tubular designs, but are generally recognized as having significant safety and reliability issues due to the complexity of sealing and manifolding a planar stack.

Thus, solid state electrochemical devices incorporating current implementations of these cell designs are expensive to manufacture and may suffer from safety, reliability, and/or efficiency drawbacks. Some recent attempts have been made to develop SOFCs capable of operating efficiently at lower temperatures and using less expensive materials and production techniques. Plasma spray deposition of molten electrolyte material on porous device substrates has been proposed, however these plasma sprayed layers are still sufficiently thick (reportedly 30-50 microns) to substantially impact electrolyte conductance and therefore device operating temperature.

Accordingly, a way of reducing the materials and manufacturing costs and increasing the reliability of solid state electrochemical devices would be of great benefit and, for example, might allow for the commercialization of such devices previously too expensive, inefficient or unreliable.

SUMMARY OF THE INVENTION

In general, the present invention provides low-cost, mechanically strong, highly electronically conductive porous structures for solid-state electrochemical devices, techniques for forming these structures, and devices incorporating the structures. In preferred embodiments, the invention provides a porous electrode designed for high strength and high electronic conductivity (to lower resistive losses in the device due to current collection). Conventional Ni—YSZ based SOFCs may be greatly improved by application of the present invention by, for example, casting a thin layer of Ni—YSZ on top of a porous high-strength alloy support—this also substantially lowers the cost of the device by using inexpensive alloy material for mechanical strength as opposed to nickel. Alternatively, alloys known to have good oxidation resistance can be used to form a high-strength air electrode in a solid state electrochemical device. In this embodiment, an alloy such as Inconel 600 is used to make a porous high-strength electrode onto which an electrolyte membrane is co-fired.

The invention provides solid state electrochemical device substrates of novel composition and techniques for forming thin electrode/membrane/electrolyte coatings on the novel or more conventional substrates. In particular, in one embodiment the invention provides techniques for co-firing of a device substrate (often an electrode) with an electrolyte or membrane layer to form densified electrolyte/membrane films 1 to 50 microns thick, preferably 5 to 20 microns thick. In another embodiment, densified electrolyte/membrane films 1 to 50 microns, preferably 5 to 20 microns thick may be formed on a pre-fired substrate by a constrained sintering process. In some cases, the substrate may be a porous non-nickel cermet incorporating one or more of the transition metals Cr, Fe, Cu, or alloys thereof.

In one aspect, the present invention provides a method of forming a ceramic coating on a solid state electrochemical device substrate. The method involves providing a solid state electrochemical device substrate, the substrate composed of a porous non-noble transition metal, a porous non-noble transition metal alloy, or porous cermet incorporating one or more of a non-noble non-nickel transition metal and a non-noble transition metal alloy. The substrate may optionally be coated with a material having high electrocatalytic activity for a specific purpose, for example methane reformation, or oxygen or hydrogen ion formation (e.g., Ni—YSZ). A coating of a suspension of a ceramic material in a liquid medium is applied to the substrate material, and the coated substrate is fired in an inert or reducing atmosphere.

In another aspect, the invention provides a solid state electrochemical device. The device includes a sintered substrate composed of a porous non-noble transition metal, a porous non-noble transition metal alloy, or a porous cermet incorporating one or more of a non-noble, non-nickel transition metal and a non-noble transition metal alloy, and a sintered coating of a ceramic material on the substrate.

In yet another aspect, the invention provides a composition. The composition is composed a substrate for a solid state electrochemical device composed of a porous cermet incorporating one or more of the transition metals Cr, Fe and Cu.

In other aspects, the invention provides devices in accordance with the present invention tailored to specific purposes, for example, oxygen generators, gas separators, solid oxide fuel cells and syn gas generators.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawing.

DETAILED DESCRIPTION OF THE INVENTION

Figure 1:
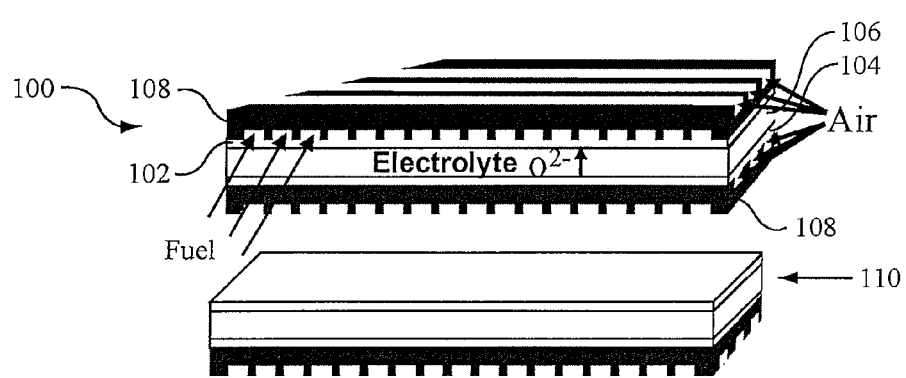
FIG. 1 depicts a planar design for a solid state electrochemical device.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details.

In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

In general, the present invention provides low-cost, mechanically strong, highly electronically conductive porous substrates for solid-state electrochemical devices. In preferred embodiments, the invention provides a porous electrode designed for high strength and high electronic conductivity (to lower resistive losses in the device due to current collection). Conventional Ni—YSZ-based SOFCs may be greatly improved by application of the present invention by, for example, casting a thin layer of Ni—YSZ on top of a porous high-strength alloy support—this also substantially lowers the cost of the device by using inexpensive alloy material for mechanical strength as opposed to nickel. Alternatively, alloys known to have good oxidation resistance can be used to form a high-strength air electrode in a solid state electrochemical device. In this embodiment, an alloy such as Inconel 600 is used to make a porous high-strength electrode onto which an electrolyte membrane is co-fired.

The invention provides compositions and techniques for economically producing solid state electrochemical cells operable at relatively low temperatures with good performance characteristics. The invention provides solid state electrochemical device substrates of novel composition and techniques for forming thin electrode/membrane/electrolyte coatings on the novel or more conventional substrates.

In particular, in one embodiment the invention provides techniques for co-firing of device substrate (often an electrode) with an electrolyte or membrane layer to form densified electrolyte/membrane films 1 to 50 microns thick, preferably 5 to 20 microns thick. In this embodiment, the substrate material is "green". In this application, the term "green" refers to materials that are unfired, or possibly pre-fired with sufficient heat to provide mechanical integrity to the material for handling, but not enough to produce any substantial dimensional change (also referred to in the art as "bisque firing"). The substrate is then coated with the electrolyte/membrane film and the assembly is heated to a temperature sufficient to sinter the substrate and densify the coating.

In another embodiment, densified electrolyte/membrane films 1 to 50 microns, preferably 5 to 20 microns, thick may be formed on a pre-fired (such that minimal or no shrinkage occurs during sintering of the film; also referred to in the art as "pre-sintered") substrate by a constrained sintering process.

In one embodiment, the invention provides a low-cost, robust, and highly conductive substrate for solid state electrochemical devices. For example, a porous iron, chromium, copper or chrome steel alloy could be used as the porous support onto which a thin film of porous Ni—YSZ is deposited. This alloy support has a much higher strength than Ni—YSZ, has a much lower cost, and has better electronic conductivity for current collection in the device. Such metals and/or alloys are stable in the reducing fuel environment.

Alternatively, the SOFC or other ionic device (oxygen separation, etc.) could be built on the air electrode, such as is done in the case of tubular SOFC designs currently in production, for example, by Westinghouse. However, in the existing design the support is pre-fired porous LSM onto which the YSZ coating is applied by CVD-EVD, a very expensive process. Also, the LSM substrate does not have sufficient electronic conductivity for highly efficient current collection. The present invention makes use of a metal or metal alloy or metal alloy cermet (where the metal or metal alloy is stable in an oxidizing environment) as the porous support. For example, a green substrate made with powdered high chrome steel alloy with or without a ceramic ionic or MIEC phase, onto which a green ionic or MIEC film is deposited. According to one embodiment, this bilayer is co-fired under reducing conditions to yield an inexpensive, mechanically robust, porous substrate with high electronic conductivity and a dense ionic membrane. In this way, the ionic device could be operated at high current density with little penalty associated with ohmic drop across the air electrode support due to current collection.

Introduction

An overview of solid state device components and construction, and the two basic designs follows. This description is provided both by way of background and introduction to the subject, and to provide design and fabrication details that may be adopted in compositions, devices, and methods in accordance with the present invention.

FIG. 1 illustrates a basic planar design for a solid state electrochemical device, for example, a solid oxide fuel cell (SOFC). The cell 100 includes an anode 102 (the "fuel electrode") and a cathode 104 (the "air electrode") and a solid electrolyte 106 separating the two electrodes. In conventional SOFCs, the electrodes and electrolytes are typically formed from ceramic materials, since ceramics are able to withstand the high temperatures at which the devices are operated. For example, SOFCs are conventionally operated at about 950° C. This operating temperature is determined by a number of factors, in particular, the temperature required for the reformation of methane to produce hydrogen and reaction efficiency considerations. Also, typical solid state ionic devices such as SOFCs have a structural element onto which the SOFC is built. In conventional planar SOFCs the structural element is a thick solid electrolyte plate such as yttria stabilized zirconia (YSZ); the porous electrodes are then screen-printed onto the electrolyte. The porous electrodes are of low strength and are not highly conductive. Alternatively, a thick porous electrode and a thin electrolyte membrane can be co-fired, yielding a electrode/electrolyte bilayer. As noted above, for the case where the electrode is a Ni—YSZ electrode of a few mm in thickness, the electrode strength is low and the cost of raw materials high.

Methane (natural gas) is plentiful, inexpensive, and rich in hydrogen, the actual fuel for the cell, and as such, is the preferred fuel source for a SOFC. Methane may be reformed to produce hydrogen at a temperature of about 650-950° C. Therefore, it is desirable to operate a SOFC at at least the lower end of this temperature range.

Another consideration governing the temperature at which a SOFC or any solid state electrochemical device is operated is the electrolyte/membrane conductivity. Conventional devices must be operated at a high enough temperature to make the ceramic electrolyte sufficiently ionically conductive for the energy producing reactions (in the case of a SOFC; other reactions for gas separators or generators). The thickness of the solid electrolyte, typically hundreds of microns thick, favors an operating temperature above 900° C. in order to achieve an acceptable conductivity. Methods exist for forming thin electrolytes on ceramic substrates, such as EVD/CVD. However, EVD/CVD is a complex and expensive technique, and the ceramic-based devices to which the technique has been applied still require high operating temperatures to be at all efficient. Unfortunately, most metals are not stable at this temperature in an oxidizing environment and very quickly become converted to brittle oxides. Accordingly, solid state electrochemical devices have conventionally been constructed of heat-tolerant ceramic materials, such as $La_{1-x}Sr_xMn_yO_{3-\delta}$ ($1 \geqq X \geqq 0.05$) ($0.95 \leqq y \leqq 1.15$) ("LSM"), and yttria stabilized zirconia (e.g., $(ZrO_2)_{0.92}(Y_2O_3)_{0.08}$) ("YSZ"). In an SOFC, this limitation is most problematic at the air electrode where oxidation can take place. In other solid state electrochemical devices, such as oxygen generators, both electrodes may be in an oxidizing environment during operation of the device, and so both may face this problem.

Referring again to FIG. 1, the cell 100 is depicted in the form in which it could be stacked with other like cells 110, as it typically would be to increase the capacity of the device. To be stacked, the cells require bipolar interconnects 108 adjacent to each electrode that are electrically, but not ionically, conductive. The interconnects 108 allow current generated in the cells to flow between cells and be collected for use. These interconnects are typically formed into manifolds through which fuel and air may be supplied to the respective electrodes (allow lateral movement of gas in channels; but not allow intermixing of gas (vertical movement)). Due to the highly exothermic combustion resulting from an uncontrolled mixture of hydrogen and oxygen, it is essential that the interconnect manifolds by well-sealed at all edges of the planer cell. Moreover, due to required operating temperatures in excess of 900° C. (e.g., 950° C.) for conventional devices, the interconnect in contact with the air electrode may not be made of metal due to high temperature corrosion.

Prior designs for solid state electrochemical planar stack devices have used ceramic materials such as lanthanum chromite to form interconnects. However, lanthanum chromite is a very expensive material, sometimes accounting for as much as 90% of the cost of a device. In addition, it is a relatively brittle material (relative to metal); less than ideal for an application requiring an absolute seal, and is significantly less conductive than metal, resulting in resistive losses that reduce the overall efficiency of the device. These problems have combined to make current planar stack implementations impractical for commercial applications.

Figure 2A:
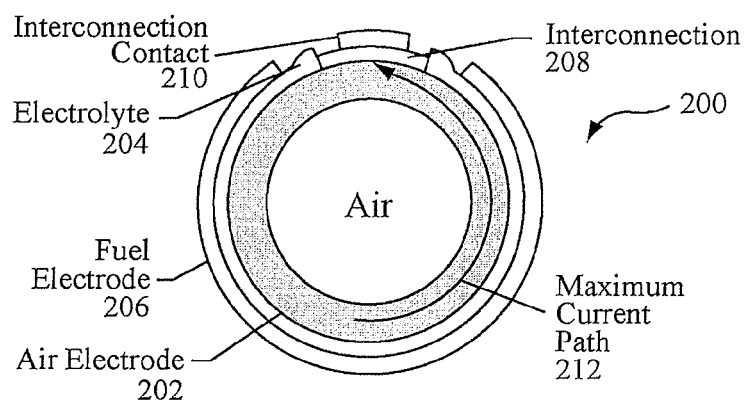
FIGS. 2A-C depict a tubular design for a solid state electrochemical device.
Figure 2B:
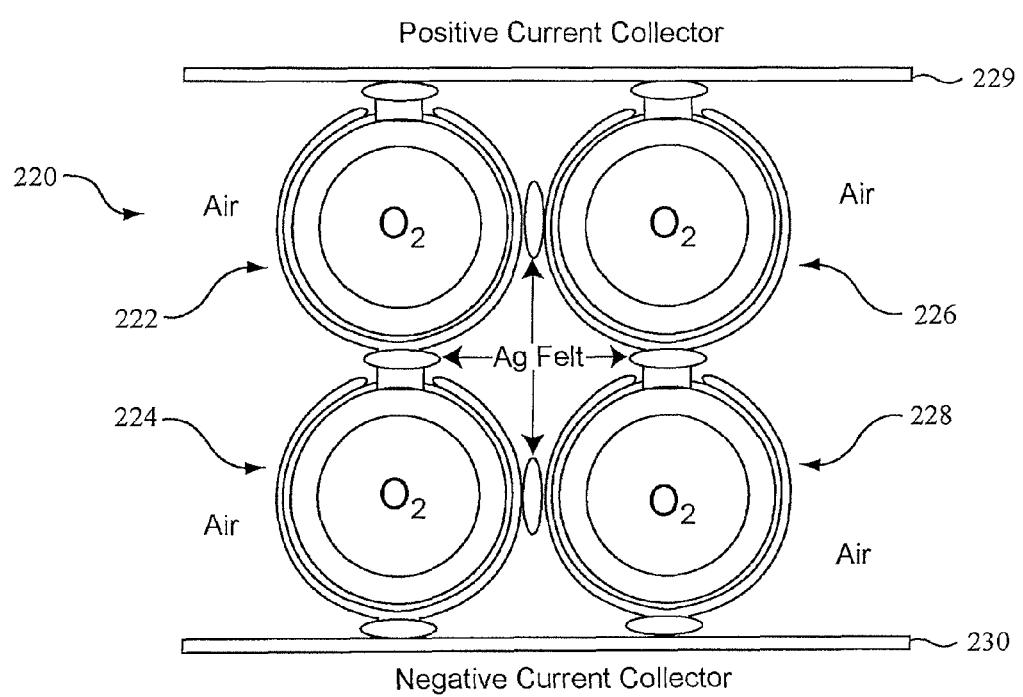
Figure 2C:
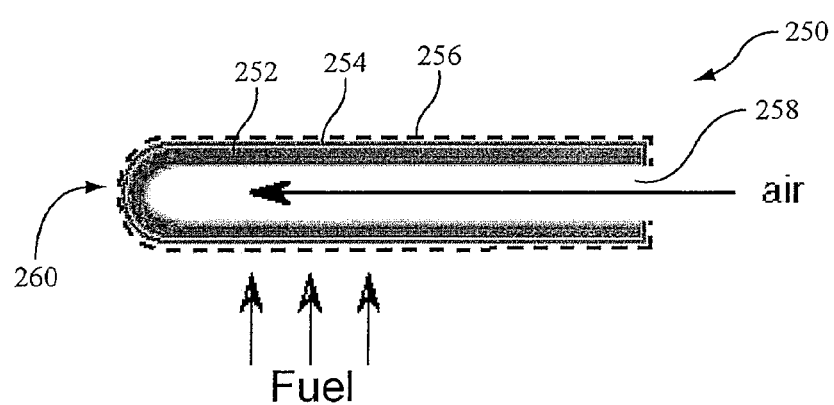

An alternative solid state electrochemical device design generally recognized as having much reduced safety concerns and greater reliability is depicted in FIGS. 2A-C. This design, commercialized by Westinghouse, for example, has a tubular shape. FIG. 2A depicts an axial cross-sectional view of a tubular SOFC 200. The inner tube is the air electrode 202, again formed from a solid ceramic material such as LSM. The air electrode 202 is coated with a solid electrolyte 204 for most of its circumference. The electrolyte is coated with the fuel electrode 206. During operation, air is flowed through the interior of the tube, while fuel (generally methane that is reformed to hydrogen during operation of the cell) is provided outside the tube. In the case of the tubular SOFC, one of the major fabrication costs is associated with the deposition of the electrolyte film by conventional chemical vapor deposition-electrochemical vapor deposition (CVD-EVD) techniques.

In order to get current produced by the fuel cell out, an electrically conductive material in contact with the electrodes is required. The material must also provide a chemical barrier to prevent intermixing of the hydrogen fuel outside the tube and the air inside. An interconnect 208, again typically composed of lanthanum chromite, is provided on the air electrode 202 over that portion of the circumference not covered by the electrolyte 204. The interconnect also typically has an interconnect contact 210 attached to it. This arrangement also allows for the stacking of tubes, as illustrated in FIG. 2B, which depicts a stacked cell device 220 composed of four tubular cells 222, 224, 226, 228, in this case oxygen generation cells, but otherwise as described above, stacked and interconnected (for example using Ag felt interconnect contacts) between a positive current collector 229 and a negative current collector 230.

FIG. 2C depicts a length-wise cross sectional view of a tubular solid state electrochemical device, such as depicted in FIG. 2A. The device 250 has a tubular shape formed by a porous air electrode (anode) 252, an electrolyte 254, and a porous fuel electrode (cathode) 266, in the case of an SOFC application of the device. The tube-shaped device has an open end 258 available for providing a gas reactant, such as air in the case of an SOFC (as shown), or extracting a gas product, such as oxygen in the case of an oxygen generator, and a closed end 260 to contain and separate the gas inside the tube from that outside. In the case of a SOFC, the fuel gas, e.g., hydrogen or methane, is typically provided outside the tube.

In this design, the seal preventing intermixing of reactant gasses, such as hydrogen fuel and air in a SOFC, are much more easily implemented. Rather than requiring a seal around all the edges, as in a planer device, the tubular device need only be sealed at the open end 258 of the tube (or can even be sealless and allowed to leak). Moreover, this end may be located out of the hot zone of the operational device. This makes the seal easier to maintain and thus renders the device more safe and reliable than conventional planar designs.

However, the tubular design has the significant drawback that current collection for the whole tube occurs at only a small area on the circumference of the tube. Referring to FIG. 2A, all current coming from all around the tube gets collected at the interconnect 208. Thus, the maximum current path 212 is about half the circumference of the tube, which may be centimeters as opposed to microns as in the case for the planar implementation. The resistive loss inherent to this design in conventional implementations can be more fully appreciated with reference to FIG. 2B where a tubular device stack is shown. Each cell in the stack contributes to a very large total internal resistance for the device 220. As a result, the tubular implementation has much lower power density than the planar devices, making the development of high power density devices using this design impractical. In addition, this design retains the drawback of being composed of materials (ceramic electrodes and interconnects) that contribute significantly to the device's internal resistive losses, thereby limiting power density While the designs depicted and described in FIGS. 1 and 2A-C are intended for use as a SOFC, the same or a similar device designs might also be used for gas separation or generation depending on the selection of materials used as the electrodes and separators, the environment in which the device is operated (gases supplied at each electrode), pressures or electrical potentials applied, and the operation of the device. For example, as described above, for a fuel cell, a hydrogen-based fuel (typically methane that is reformed to hydrogen during operation of the device) is provided at the fuel electrode and air is provided at the air electrode. Oxygen ions ($O^{2-}$) formed at the air electrode/electrolyte interface migrate through the electrolyte and react with the hydrogen at the fuel electrode/electrolyte interface to form water, thereby releasing electrical energy that is collected by the interconnect/current collector.

In the case of the fuel cell, the electrolyte is composed of a solely ionic conducting material, such as yttria stabilized zirconia (YSZ). If the same device is operated as an electrolytic device, that is, rather than getting energy out of the device, energy is provided to the device as a potential applied across the two electrodes, ions formed from gas (e.g., oxygen ions from air) at the cathode will migrate through the electrolyte (which is selected for its conductivity of ions of a desired pure gas) to produce pure gas (e.g., oxygen) at the anode. If the electrolyte is a proton conducting thin film (for example, doped $BaCeO_3$, doped $SrCeO_3$ or doped $SrZrO_3$) instead of an oxygen ion conductor, the device could be used to separate hydrogen from a feed gas containing hydrogen mixed with other impurities, for instance resulting from the steam reformation of methane ($CH_4 + H_2O = 3H_2 + CO$). Protons (hydrogen ions) formed from the $H_2/CO$ mixture at one electrode/thin film interface could migrate across the thin film driven by a potential applied across the electrodes to produce high purity hydrogen at the other electrode. Thus the device may operate as a gas generator/purifier.

Such a device could also function as a electrochemical syn gas generator. Syn gas ($H_2 + CO$) is a valuable product used for synthesis of higher value organics. It is typically produced by the partial oxidation of methane with pure oxygen. Since the pure oxygen must be separated from air in a separate process, syn gas production is relatively expensive. In this case, the feed to the fuel electrode is methane, and air is supplied to cathode, as with the fuel cell. However, the device is run at a current density where methane is only partially oxidized to $H_2$ and CO, as opposed to deep oxidation in typical fuel cell operation to produce $H_2O$ and $CO_2$.

If the solely ionic conducting electrolyte is replaced with a mixed ionic electronic conducting (MIEC) membrane, such as LSM, and instead of applying a potential across the electrodes, air at high pressure is provided on one side of the membrane, oxygen ions formed from the air at the membrane will migrate through the membrane to produce pure oxygen at the other side of the membrane. Thus the device may operate as an oxygen gas separator.

Fabrication Techniques, Compositions and Substrates of the Invention

Figure 3A:
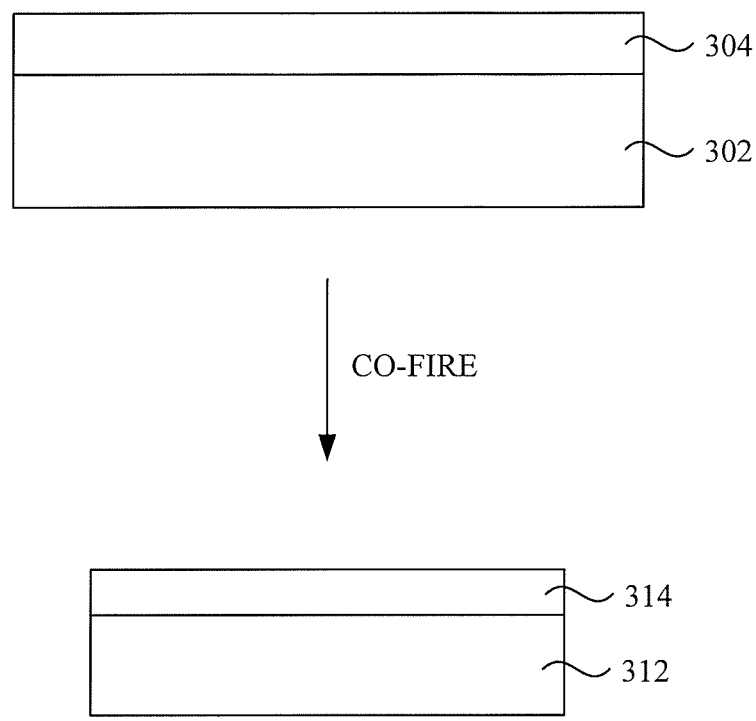
FIG. 3A depicts stages in a co-firing process in accordance with one embodiment the present invention.

FIG. 3A depict stages in a co-firing process in accordance with one embodiment the present invention. An unfired ("green") solid state electrochemical device substrate material 302 is formed and coated with a thin layer of electrolyte/membrane material 304. The substrate material 302 may be a cermet, for example, composed of 50 vol % $Al_2O_3$ (e.g., AKP-30) and 50 vol % Inconel 600 (available from Powder Alloy Corp) with a small amount of binder (e.g., XUS 40303 from Dow Chemical Company). The cermet components may be mixed in water and dried, and the resulting powder ground and sieved, for example to less than about 100 μm. The powder may be pressed (e.g., at about 5000 lbs.) into a green substrate layer, for example, in the form of a disk.

Of course, other solid state electrochemical device substrates may also be used. Suitable substrate materials in accordance with the present invention include other cermets, metals and alloys. Suitable ceramic components for cermets include $La_{1-x}Sr_xMn_yO_{3-\delta}$ ($1 \geq X \geq 0.05$) ($0.95 \leq y \leq 1.15$) ("LSM"), $La_{1-x}Sr_xCoO_{3-\delta}$ ($1 \geq X \geq 0.10$) ("LSC"), $SrCo_{1-x}Fe_xO_{3-\delta}$ ($0.30 \geq X \geq 0.20$), $La_{0.6}Sr_{0.4}Co_{0.6}Fe_{0.4}O_{3-\delta}$, $Sr_{0.7}Ce_{0.3}MnO_{3-\delta}$, $LaNi_{0.6}Fe_{0.4}O_3$, $Sm_{0.5}Sr_{0.5}CoO_3$, yttria stabilized zirconia (YSZ), scandia stabilized zirconia (SSZ) $(CeO_2)_{0.8}(Gd_2O_3)_{0.2}$ (CGO), $La_{0.8}Sr_{0.2}Ga_{0.85}Mg_{0.15}O_{2.825}$ (LS GM20-15), $(Bi_2O_3)_{0.75}(Y_2O_3)_{0.25}$ and alumina. Preferred LSM materials include $La_{0.8}Sr_{0.2}MnO_3$, $La_{0.65}Sr_{0.30}MnO_{3-\delta}$, $La_{0.45}Sr_{0.55}MnO_{3-\delta}$. Suitable metal components for the cermets are transition metals Cr, Fe, Cu and/or alloys such as low-chromium ferritic steels, such as type 405 and 409 (11-15% Cr), intermediate-chromium ferritic steels, such as type 430 and 434, (16-18% Cr), high-chromium ferritic steels, such as type 442, 446 and E-Brite (19-30% Cr), chrome-based alloys such as Cr5Fe1Y and chrome-containing nickel-based Inconel alloys including Inconel 600 (Ni 76%, Cr 15.5%, Fe 8%, Cu 0.2%, Si 0.2%, Mn 0.5%, and C 0.08%). The substrate material may also be a porous metal such as transition metals chromium, copper, iron and nickel, or a porous alloy such as low-chromium ferritic steels, such as type 405 and 409 (11-15% Cr), intermediate-chromium ferritic steels, such as type 430 and 434, (16-18% Cr), high-chromium ferritic steels, such as type 442, 446 and E-Brite (19-30% Cr), chrome-based alloys such as Cr5Fe1Y and chrome-containing nickel-based Inconel alloys including Inconel 600 (Ni 76%, Cr 15.5%, Fe 8%, Cu 0.2%, Si 0.2%, Mn 0.5%, and C 0.08%).

In some embodiments of the present invention, the substrate may be a porous non-nickel cermet incorporating one or more of the transition metals Cr, Fe, Cu, or alloys thereof. These metals are particularly well-suited for use in the high temperature reducing or oxidizing environments of some components of solid state electrochemical devices, particularly oxidizing electrodes and interconnects, since under such conditions they form a thin oxide surface layer having a growth rate constant of no more than about $1 \times 10^{-12}$ $cm^2/sec$ that protects them from further oxidation while they retain their beneficial metal properties. Porous substrates made from these materials preferably have a fracture strength in excess of 5 Mpa (megapascals), more preferably 40 MPa, and still more preferably 100 MPa. Examples of these materials include YSZ—Cr5Fe1Y, CGO—Cr5Fe1Y, YSZ SS409, 410 or 430, and CGO SS409, 410 or 430.

The electrolyte membrane material 304 may be a thin layer of a metal oxide (ceramic) powder, such as yttria stabilized zirconia (YSZ) (e.g., $(ZrO_2)_{0.92}(Y_2O_3)_{0.08}$ or $(ZrO_2)_{0.90}(Y_2O_3)_{0.10}$) available for example, from Tosoh Corp. Other possible electrolyte materials include $(ZrO_2)_{0.9}(Sc_2O_3)_{0.1}$ scandia stabilized zirconia (SSZ), $(CeO_2)_{0.8}(Gd_2O_3)_{0.2}$ (CGO), $La_{0.8}Sr_{0.2}Ga_{0.85}Mg_{0.15}O_{2.825}$ (LS GM20-15) and $(Bi_2O_3)_{0.75}(Y_2O_3)_{0.25}$. Alternatively, the membrane material may be a mixed ionic electronic conductor, for example $SrCo_{1-x}Fe_xO_{3-\delta}$ ($0.30 \geq X \geq 0.20$), $La_{0.6}Sr_{0.4}Cu_{0.6}Fe_{0.4}O_{3-\delta}$, $La_{0.8}Sr_{0.2}MnO_3$, $La_{0.65}Sr_{0.30}MnO_3$, $La_{0.45}Sr_{0.55}MnO_3$, $Sr_{0.7}Ce_{0.3}MnO_{3-\delta}$, $LaNi_{0.6}Fe_{0.4}O_3$, $Sm_{0.5}Sr_{0.5}CoO_3$ and $La_{1-x}Sr_xCoO_{3-\delta}$. Such structures may find use in oxygen separation devices, for example, as described above.

The electrolyte/membrane material 304 is generally prepared as a suspension of the powder material in a liquid media, such as water, isopropanol, and other suitable organic solvents may be applied to a surface of the pressed substrate layer by a variety of methods, for example by one of aerosol spray, dip coating, electrophoretic deposition, vacuum infiltration, and tape casting.

At this stage, both materials are green; that is, neither material has yet been fired to a temperature sufficiently high to sinter the materials. As is known in the art, sintering refers to a process of forming a coherent mass, for example from a metallic powder, by heating without melting. The resulting coated substrate assembly may be pressed again (e.g., to about 6000 psi.) to increase the green density of the YSZ electrolyte film and enhance electrode electrolyte adhesion. Then, the assembly may be fired in an inert or reducing atmosphere at a temperature sufficient to sinter the substrate and densify the electrolyte, for example at about 1200-1500° C. In one example the assembly may be placed film side down in a molybdenum furnace under 2 psi flowing He. The furnace may be heated initially to 450° C., and then at a rate of 5° C./min to 1350° C., held for 4 hr, and then cooled at a rate of 5° C./min.

As shown in FIG. 3A, the fired electrode/electrolyte bilayer will shrink, for example, on the order of about 10% as the materials sinter and the electrolyte/membrane densifies. The fired electrolyte 314 must be sufficiently densified to provide a gas-tight barrier between the gases at each electrode. The fired electrode 312 is preferably at least 90% densified (about 10% porosity), and may be as much as about 95% densified, or even about 98% densified. After the co-firing, the substrate remains porous, in one embodiment to less than about 80% dense (preferably about 60 to 70% dense (about 30 to 40% porosity), in order to allow gases to diffuse through the electrode (where the substrate is an electrode) or to it (where the substrate is a support for an electrode, as discussed further below).

The thickness of the densified electrolyte films prepared in accordance with preferred embodiments of the present invention may be from about 1 to 50 microns; more preferably from about 3 to 30 microns; even more preferably about 5 to 20 microns. The fabrication of such thin, substantially gas-tight solid oxide films in an economical manner is an important aspect of the present invention with distinct advantages over the thicker, more expensive and/or more difficult to fabricate electrolyte layers of conventional solid state electrochemical device fabrication.

In one preferred embodiment the substrate is a porous metal, such as Ni or Cr, or even more preferably, a metal alloy such as FeCr and is selected so that its coefficient of thermal expansion (CTE) is close (e.g., within about 20%; preferably within about 10%; more preferably within about 2%) to that of the metal oxide electrolyte film (or other material layer) to be supported. This type of CTE matching of the substrate and thin film layer may be easily determined from literature sources or with minimal experimentation by those skilled in the art.

In such cases where the substrate is a metal or alloy, it is important that the assembly be fired at a temperature sufficient to result in sintering of the green electrolyte film without reaching the melting point of the substrate. Since the atmosphere during sintering is selected to be inert or reducing, the metal or alloy substrate does not substantially oxidize and therefore retains it beneficial metal properties. In many cases, solid state electrochemical devices incorporating structures in accordance with the present invention will be capable of efficient operation at temperatures below those at which the metals or alloys would oxidize too rapidly in an oxidizing environment (e.g., about 650-800° C.). Depending on the composition of the various components within the parameters defined herein, devices in accordance with the present invention may be suitable for operation through a range of temperatures from about 400 to 1000° C. In one embodiment, SOFC devices in accordance with the present invention are operated at about 650° C. so that methane may be reformed for hydrogen fuel during operation of the device. In other embodiments, devices may be effectively operated at temperatures as low as about 400° C.

Moreover, where the porous substrate is used in a reducing or fuel environment, the metal or metal alloy is inherently stable and thus may be formed from a wider array of metals. For example, a porous iron or Inconel support may be used as the robust structural element for the fuel electrode in a SOFC, on top of which a thin layer of a more electrochemically active material, such as Ni—YSZ, may be used for charge/transfer reactions.

The ability to operate solid state electrochemical devices at temperatures below 800° C. provided by the present invention is an important advantage over conventional technology. At such operating temperatures, metals may be used to fabricate components of devices, including substrates and electrodes, as described above, and also importantly interconnects. The ability to use metals rather than ceramics such as lanthanum chromite for interconnects makes sealing of electrochemical devices much easier. Metals are much easier to machine than ceramics, and may be worked with in conventional ways to form good seals and electrical contacts, such as by welding, brazing, etc. Thus, planar electrochemical device designs, with all their low internal resistance characteristics, may be made economically feasible and reliable.

Moreover, the material cost of metal is much lower than the rare earth elements that go into the ceramic and cermet materials they replace. Metals also have higher thermal conductivity than ceramics or cermets which results in results in lower heat-related stresses and reduces the need for cooling with excess gas. And metals have higher electrical conductivity, resulting in decrease internal resistance and therefore improved performance of solid state electrochemical devices. Metals are less brittle and therefore less susceptible to catastrophic failure than ceramics allowing the fabrication of larger cells and devices.

As discussed further below, an intermediate layer, for example, an porous electrode layer having a composition such as described above for the support material may be applied between the support material and the electrolyte layer. Further, as described further below, multiple porous layers may be applied to the opposing side of the metal oxide electrolyte layer, and on the opposing side of the porous substrate.

Figure 3B:
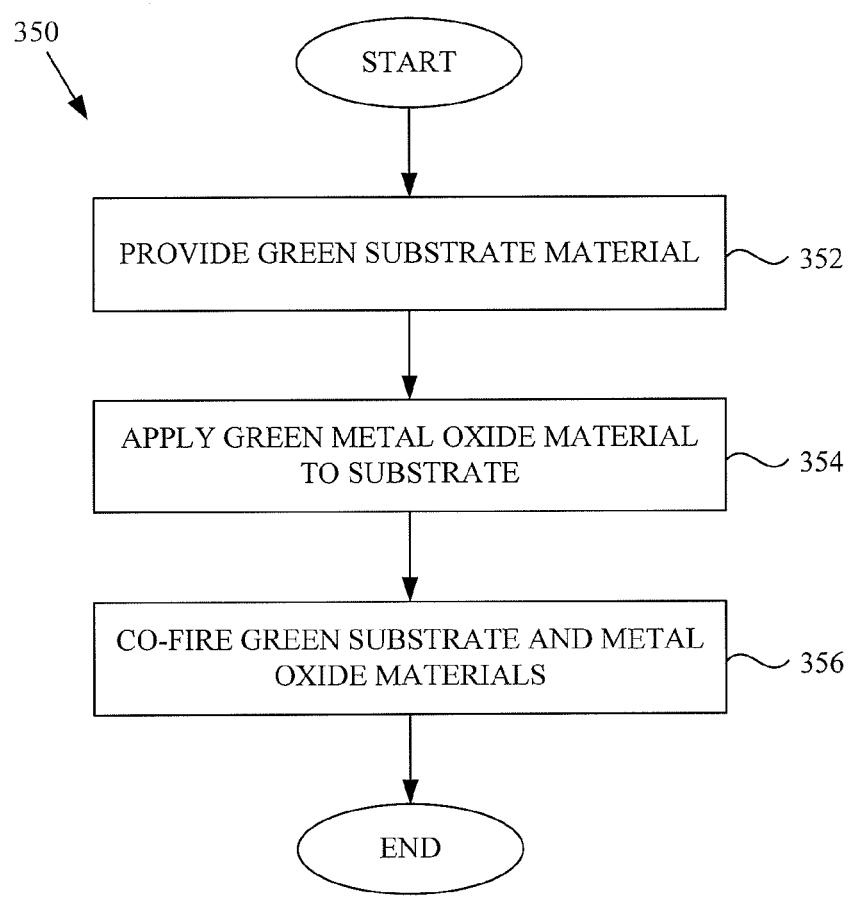
FIG. 3B is a flow chart depicting stages of a co-firing process in accordance with one embodiment the present invention.

FIG. 3B is a flow chart depicting stages (350) of a co-firing process in accordance with one embodiment the present invention. A green substrate material is formed or provided according to the parameters described above (352). A green metal oxide material, such as a precursor for forming a solid oxide electrolyte is applied to a surface of the substrate, for instance as a suspension as described above (354). The green substrate and metal oxide coating are then co-fired in an inert or reducing environment at a temperature sufficient to sinter the substrate material into a porous substrate layer and the sinter and densify the metal oxide layer into a gas-tight electrolyte membrane (356). Co-firing provides the additional benefit of improved interfacial properties at the newly-formed substrate/membrane interface since the substrate and coating materials sinter together at the interface.

Figure 4A:
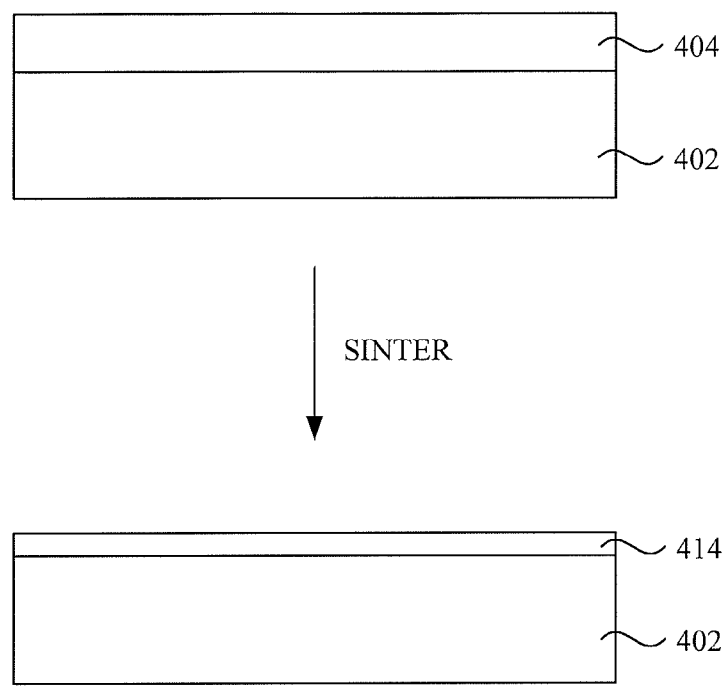
FIG. 4A depicts stages in a constrained sintering process in accordance with one embodiment the present invention.
Figure 4B:
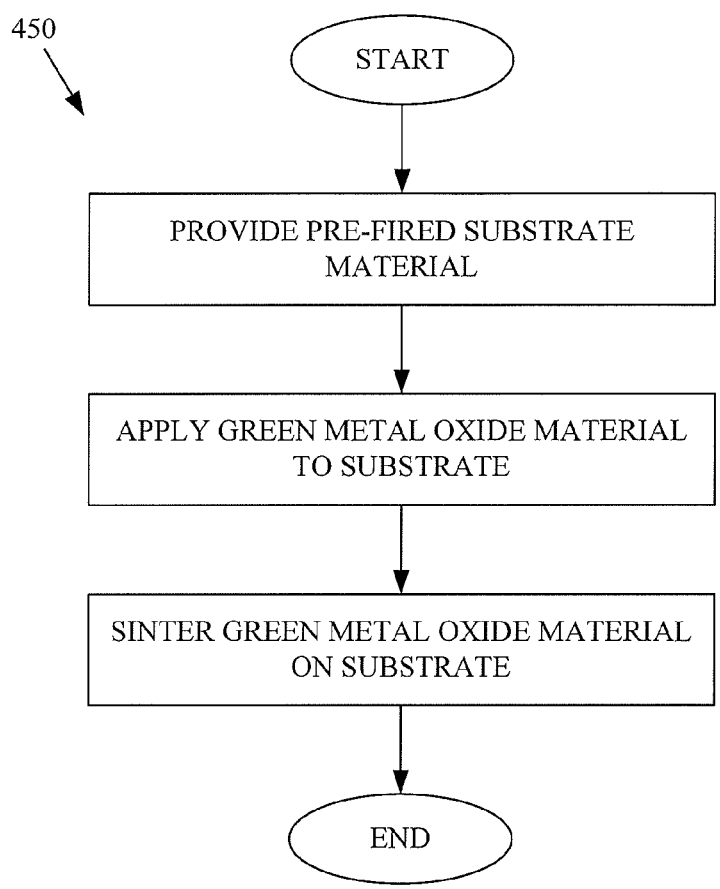
FIG. 4B is a flow chart depicting stages of a constrained sintering process in accordance with one embodiment the present invention.

According to another embodiment of the present invention, a green metal oxide coating may be sintered on a pre-fired porous substrate in a process referred to as constrained sintering. FIG. 4A depicts stages in a constrained sintering process in accordance with one embodiment the present invention, and FIG. 4B is a flow chart depicting stages (450) of a constrained sintering process in accordance with one embodiment the present invention. The materials and techniques used to form the substrate and coating components may be otherwise the same as described above with reference to the co-firing process. However, in this embodiment, the substrate 402 is pre-fired (pre-sintered), for example at about 1200-1500° C. (e.g., 1350° C.) in a molybdenum or graphite furnace (452). A green metal oxide material 404 is then applied to the pre-fired substrate (454), for example in a suspension as described above, and the metal oxide coating is sintered in a reducing atmosphere on the substrate, for example at about 1200-1500° C. (e.g., 1350° C.) in a molybdenum or graphite furnace.

In the case of constrained sintering, the pre-fired porous substrate 402 is invariant, so it is only the coating material layer that shrinks during sintering. The final properties of the substrate 402 and the sintered electrolyte layer 414 should be the same as described above with reference to the co-firing process. That is, the substrate should be porous with about 20% or greater porosity in one embodiment, and the electrolyte membrane should be densified so as to provide a gas-tight membrane, generally at least about 90% densified.

Structures

As noted above, structures and devices in accordance with the present invention may also include a plurality of layers on either side of the substrate/electrolyte composite described above. Moreover, it is possible to add a separate thin electrode layer on the substrate layer intermediate between the substrate and the electrolyte. For example, in some instances it may facilitate processing, increase strength and/or decrease device cost to produce a porous substrate from one material that may not have high electrocatalytic activity selected for a particular purpose, and then form a thin electrode on that substrate material according to well known processing techniques, before adding an electrolyte layer according to the procedures described herein. For example, on the substrate side an additional layer may be spray-coated or vacuum infiltrated onto the substrate, then the electrolyte layer may be added and the whole assembly co-fired. A second electrode could added as a green layer on the green electrolyte layer and then co-fired with the other two layers, or it could be added after the co-firing of the other two layers and bonded in a second firing step.

Figure 5A:
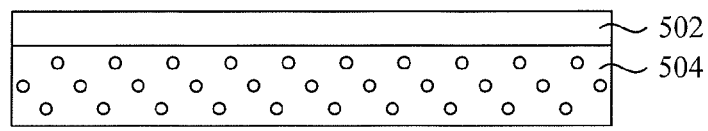
FIGS. 5A-E illustrate multi-layer substrate/electrode/electrolyte structures in accordance with various implementations in accordance with the present invention.

FIGS. 5A-E illustrate multi-layer structures in accordance with various implementations in accordance with the present invention. FIG. 5A shows a densified electrolyte layer 502 on a porous substrate 504. In this embodiment, the substrate may act as an electrode.

Figure 5B:
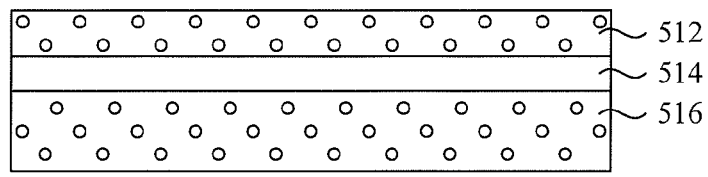

FIG. 5B shows a porous electrode layer 512 on a densified electrolyte layer 514 on a porous substrate 516. Where the substrate acts as a second electrode, this structure forms an electrochemical cell.

Figure 5C:
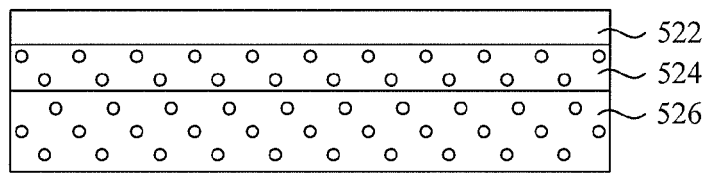

FIG. 5C shows a densified electrolyte layer 522 on a porous electrode layer 524 on a porous substrate 526. This implementation may be used where, for example, the substrate 526 is composed of an inexpensive high strength material, such as a metal, and the electrode layer 524 is composed of a material having high electrocatalytic activity for a specific purpose, for example methane reformation, or oxygen or hydrogen ion formation. As noted above, conventional Ni—YSZ-based SOFCs may be greatly improved in accordance with this aspect of the present invention by, for example, casting a thin layer of Ni—YSZ on top of a porous high-strength alloy support—this also substantially lowers the cost of the device by using inexpensive alloy material for mechanical strength as opposed to nickel.

Figure 5D:
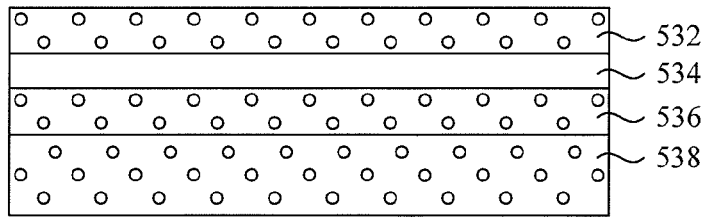

FIG. 5D shows a porous second electrode layer 532 on a densified electrolyte layer 534 on a porous first electrode layer (having high electrocatalytic activity, e.g., Ni—YSZ) 536 on a porous substrate (which may not have high electrolcatalytic activity, but may have other benefits, such as mechanical strength and/or low cost, e.g., intermediate-chromium ferritic steels, such as type 430 and 434) 538. This implementation completes a cell for an SOFC implementation such as that described with reference to FIG. 5C.

Figure 5E:
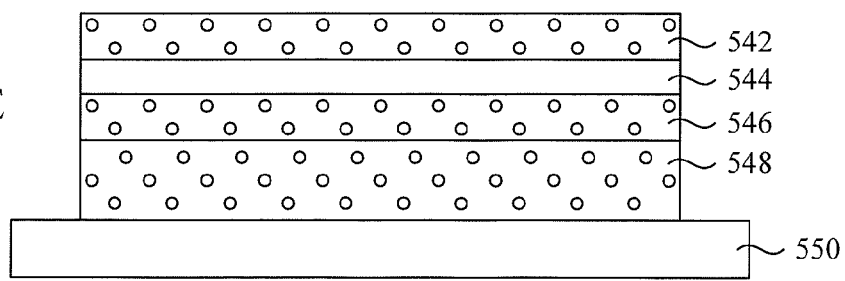

FIG. 5E shows a porous second electrode layer 542 on a densified electrolyte layer 544 on a porous first electrode layer 546 on a porous substrate 548, such as that described with reference to FIGS. 5C and 5D. The porous substrate is bonded to an interconnect 550, in a preferred embodiment of the invention a metal interconnect.

The techniques described herein, and the structures they produce may be used in the fabrication of a variety of electrochemical devices, as described above, to reduce cost, improve performance and reliability, and reduce operating temperature for an efficient device. It should be understood that the fabrication techniques and structures described herein may be implemented in either planar or tubular solid state electrochemical device designs.

EXAMPLES

The following examples describe and illustrate aspects and features of specific implementations in accordance with the present invention. It should be understood the following is representative only, and that the invention is not limited by the detail set forth in these examples.

Example 1

Figures 6A, 6B:
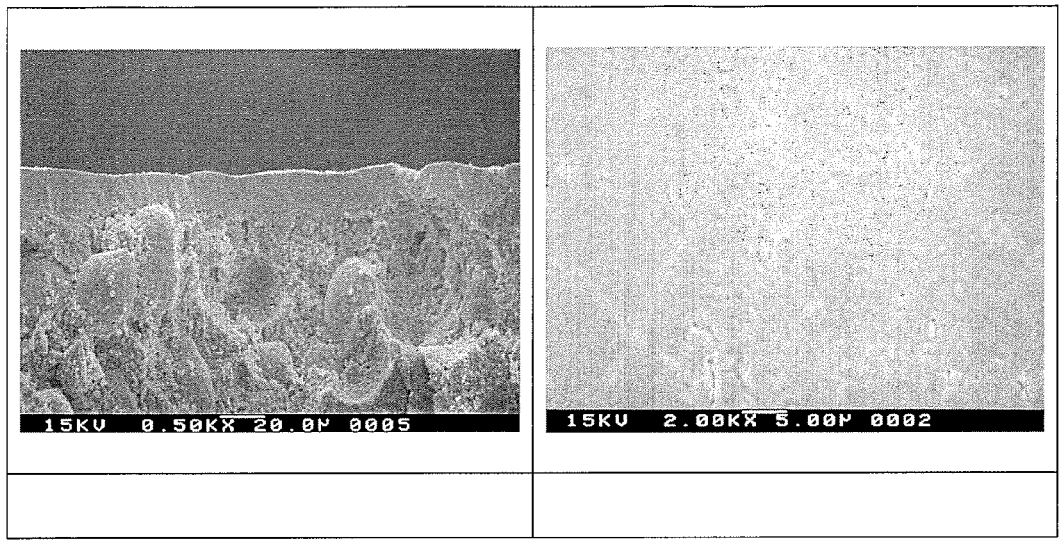
FIGS. 6A and 6B show a scanning electron microscope (SEM) edge view of the Inconel and alumina substrate with the YSZ film, and an SEM top surface of the YSZ film on the Inconel and alumina substrate, respectively, in accordance with one embodiment the present invention.
Figure 6C:
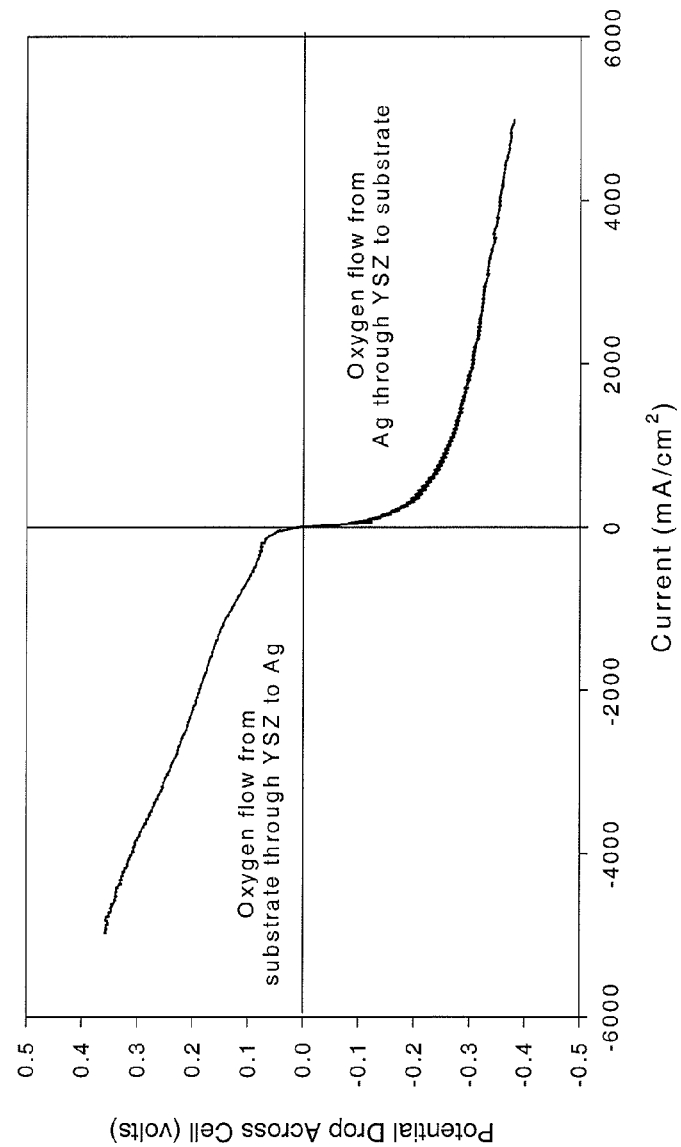
FIG. 6C illustrates the electrochemical performance an electrochemical device incorporating the structure of FIGS. 6A and 6B.

Co-firing of YSZ Film on Inconel-Alumina Substrate 50 vol % $Al_2O_3$ (AKP-30) and 50 vol % Inconel 600 (Powder Alloy Corp.) with a small amount of binder (XUS 40303 from Dow Chemical Company) were mixed in water and dried. The resulting powder was ground in a mortar and pestle and sieved to <100 μm. 5 g of the powder was pressed to 5000 psi in an 1.5 in steel die. A thin layer of YSZ powder (Tosoh Corp.) was applied to one surface of the pressed disk. The coated disk was again pressed to 6000 psi to increase the green density of the YSZ film and enhance adhesion. The disk was placed film side down in a molybdenum furnace under 2 psi flowing He. The furnace was manually heated to 450° C., and then at a rate of 5° C./min to 1350° C., held for 4 hr, and then cooled at a rate of 5° C./min. The resulting bilayer shrank 10%. The film side was shiny and clear, the uncoated side was slightly pinkish (chromia scale). FIGS. 6A and 6B show a scanning electron microscope (SEM) edge view of the Inconel and alumina substrate with the YSZ film, and an SEM top surface of the YSZ film on the Inconel and alumina substrate respectively. FIG. 6C illustrates the electrochemical performance an electrochemical device incorporating this structure at 750° C.

CONCLUSION

Although the foregoing invention has been described in some detail for purposes of clarity of understanding, those skilled in the art will appreciate that various adaptations and modifications of the just-described preferred embodiments can be configured without departing from the scope and spirit of the invention. Moreover, the described processing distribution and classification engine features of the present invention may be implemented together or independently. Therefore, the described embodiments should be taken as illustrative and not restrictive, and the invention should not be limited to the details given herein but should be defined by the following claims and their full scope of equivalents.

What is claimed is:

1. A method of generating syn gas, comprising:
providing an electrochemical device having a membrane, the membrane comprising a sintered substrate consisting essentially of a material selected from the group consisting of a porous non-noble transition metal, a porous non-noble transition metal alloy, and a porous cermet incorporating one or more of a non-noble, non-nickel transition metal and a non-noble transition metal alloy; and a sintered coating of a ceramic material on the substrate wherein said coating is a mixed ionic electronic conductor;

providing air on one side of the membrane and a hydrocarbon on the other side of the membrane, whereby oxygen ions from the air migrate through the membrane to partially oxidize the hydrocarbon to produce syn gas.

2. The method of claim 1, wherein the hydrocarbon is methane.

3. The method of claim 1, wherein said mixed ionic electronic conductor is selected from the group consisting of $SrCo_{1-x}Fe_xO_{3-\delta}$ ($0.30 \geqq X \geqq 0.20$), $La_{0.6}Sr_{0.4}Co_{0.6}Fe_{0.4}O_{3-\delta}$, $La_{0.8}Sr_{0.2}MnO_3$, $La_{0.65}Sr_{0.30}MnO_3$, $La_{0.45}Sr_{0.55}MnO_3$, $Sr_{0.7}Ce_{0.3}MnO_{3-\delta}$, $LaNi_{0.6}Fe_{0.4}O_3$, $Sm_{0.5}Sr_{0.5}CoO_3$ and $La_{1-x}Sr_xCoO_{3-\delta}$.

4. The method of claim 3, wherein said MIEC is $La_{0.6}Sr_{0.4}Co_{0.6}Fe_{0.4}O_{3-\delta}$.

5. The method of claim 1, wherein the membrane film is 1 to 50 microns thick.

6. The method of claim 1, wherein the membrane film is 5 to 20 microns thick.

7. The method of claim 1, wherein the device is tubular.

8. The method of claim 1, wherein the device is planar.

9. The method of claim 1, wherein in the providing of the electrochemical device the sintered coating is made by co-firing of the substrate and coating.

10. The method of claim 1, wherein in the providing of the electrochemical device the sintered coating is made by constrained sintering of the substrate and coating.

* * * * *